United States Patent [19]
Gourdin

[11] Patent Number: 4,961,676
[45] Date of Patent: Oct. 9, 1990

[54] GOODS TRANSPORT SYSTEMS WHICH ARE TRANSFORMABLE INTO RAIL VEHICLES, AND RAIL BOGIES FOR USE THEREWITH

[75] Inventor: Jean-Paul Gourdin, La Seyne sur Mer, France

[73] Assignee: Intermotra, Toulon Cedex, France

[21] Appl. No.: 277,285

[22] Filed: Nov. 29, 1988

[30] Foreign Application Priority Data

Dec. 11, 1987 [FR] France ................................. 87 17535
Oct. 28, 1988 [FR] France ................................. 88 14480

[51] Int. Cl.$^5$ .............................................. B61F 5/04
[52] U.S. Cl. ..................................... 410/53; 105/199.1; 105/215.2
[58] Field of Search ............. 105/199.1, 215.2, 366 R; 410/91, 73, 53

[56] References Cited

U.S. PATENT DOCUMENTS

| | | | |
|---|---|---|---|
| 2,188,096 | 1/1940 | Hughes | 105/215.2 |
| 2,844,108 | 7/1958 | Madden | 410/56 X |
| 3,410,227 | 11/1968 | Gutridge | 410/73 |
| 3,580,557 | 3/1971 | Dean | 267/3 |
| 3,807,313 | 4/1974 | Koyanagi | 105/199.1 X |
| 4,385,857 | 5/1983 | Willets | 410/53 |
| 4,405,271 | 9/1983 | Adams | 410/53 |
| 4,737,055 | 4/1988 | Scully | 410/91 X |

FOREIGN PATENT DOCUMENTS

| | | | |
|---|---|---|---|
| 662145 | 4/1963 | Canada | 105/366 R |
| 143614 | 11/1964 | European Pat. Off. | |
| 0143614 | 11/1983 | European Pat. Off. | |
| 1358504 | 3/1964 | France | |
| 1598994 | 7/1970 | France | |

Primary Examiner—Andres Kashnikow
Assistant Examiner—Kevin P. Weldon
Attorney, Agent, or Firm—Ladas & Parry

[57] ABSTRACT

Systems for transporting goods such as road vehicles or containers are transformable into rail vehicles. The systems comprise respective decks each equipped at each end with a pair of cylindro-conical vertical bushes which flare downwardly for receiving respective vertical conical pegs carried by an intermediate chassis on a rail bogie, with said conical pegs serving to center the deck and fix it to the bogie.

15 Claims, 11 Drawing Sheets

GOODS TRANSPORT SYSTEMS WHICH ARE TRANSFORMABLE INTO RAIL VEHICLES, AND RAIL BOGIES FOR USE THEREWITH

DESCRIPTION

The present invention relates to goods transport systems which are easily transformable into rail vehicles, and to rail bogies for use therewith.

The field of the invention is that of vehicle construction and transport systems.

BACKGROUND OF THE INVENTION

Goods transport vehicles are known of the type comprising a deck which is provided at its front end with a pivot and with a retractable group or "landing leg", and at its rear end with a retractable road axle assembly, thus enabling the deck to be used both as a semi-trailer on the road and also to be placed on axles or bogies fitted with flanged wheels suitable for running on rails, thereby enabling the vehicle to be transformed into a rail vehicle and coupled in a train.

French Pat. No. 1 368 963 (P. Perrot) describes semi-trailers of this type which are capable of being placed on two removeable load-carrying bogies, and in which each bogie is fitted with an auxiliary chassis carrying a standard rail coupling system.

The deck of the semi-trailer and the front and rear auxiliary chassis are assembled together by means of lateral bolts. In addition, the pivot of the semi-trailer participates in assembling the semi-trailer to the front auxiliary chassis.

French Pat. No. FR 78/18.875 (publication 2.395.852) (The Bi-Modal Corporation) describes dual-purpose rail/road semi-trailers, each of which includes, at its rear end, a retractable road axle assembly and a rail bogie which is also retractable, and which remains fixed to the semi-trailer. The chassis of the semi-trailer is supported by via pneumatic springs both when using the road axle assembly and when using the rail axle assembly.

European patent application No. EP-A-0 112 778 (P. Perrot) describes transformable vehicles usable for road or rail transport, each comprising a load-carrying deck fitted with longitudinal frame members having an omega-shaped cross-section. The deck is fitted with a retractable road axle assembly and it is suitable for being placed on two removeable rail bogies each including an intermediate chassis carrying rail coupling devices.

Each intermediate chassis includes vertically movable blocks fitted with wheels over which a plate forming a portion of the deck can run, thereby enabling the deck to be displaced transversely for centering purposes. The intermediate chassis is fitted with pivoting hooks which hook onto the side edges of the deck in order to lock the deck to the bogies.

In addition, the deck includes transverse wheels which bear against the intermediate chassis, thereby allowing the deck to slide in translation over the intermediate chassis in the event of a shock.

French Pat. No. FR 1 598 994 (P. Perrot) describes rail/road semi-trailers, each of which include a chassis fitted at its front end with a prop, and at its rear end with a road axle assembly that can be raised by means of a ram, which chassis can be placed on and bolted to two rail bogies each of which is fitted with an auxiliary chassis carrying coupling members. The bolts operate transversely.

French Pat. No. FR 1 358 504 (C. Douheret) describes semi-trailers including rear axles carrying rail wheels onto which road wheels can be fitted, and having front portions suitable for placing on a rail front axle assembly via the coupling pivot of the semi-trailer.

The chassis and the rail front axle assembly are locked together by means of pins.

Publication No. EP-A-0 143 614 (Trailer Train Limited) describes semi-trailers which are fitted with raisable rail axle assemblies.

The rear end of each semi-trailer includes a box section enabling the chassis to be placed on a rail bogie and enabling it to be bolted thereto.

The front end of the chassis carries a draw-bar which enables it to be pivotally coupled to the rear end of the preceding rail vehicle.

The present invention relates not only to dual-purpose rail/road vehicles of the type described in the above documents which may be used either as road semi-trailers or else as articulated or non-articulated rail vehicles, but also to decks which are incorporated in multi-mode goods transport systems, e.g. containers suitable for transport by ship, by air, or on road vehicles, and which may be transformed into articulated or non-articulated rail vehicles.

For reasons of simplicity, the term "container" is used below in a general sense to designate not only decks which are fitted with a closed box structure, but also decks for carrying tanks or hoppers for transporting powder materials, or bare decks, or decks fitted with side boards.

Multi-mode goods transport system capable of being transformed into rail vehicles are very practical since they enable a consignment of goods to be transported both by rail and then by some other mode of transport, e.g. road, ship, or by air, without having to trans-ship the goods individually.

Multi-mode transport systems capable of being transformed into rail vehicles present practical implementation problems where the deck is placed on rail bogies. It is necessary for the deck to center itself automatically relative to the bogies without requiring large forces to be applied. It is also necessary for the mechanical connection between the deck of the system and the intermediate chassis of the bogie to be capable of withstanding large traction and compression forces whenever the deck is used as a rail vehicle incorporated in a train.

An object of the present invention is to provide goods transport systems capable of being transformed into rail vehicles and including improved means for centering and the deck of the transport system relative to the intermediate chassis fitted to rail bogies, and for mechanically connecting it thereto.

Another object of the present invention is to provide goods transport systems capable of being transformed both into normal rail vehicles which are coupled to one another by couplings, and into articulated rail vehicles, thereby enabling a single deck to be incorporated in a multiple unit of articulated vehicles and then in a normal train.

SUMMARY OF THE INVENTION

The present invention provides a goods transport system capable of being transformed into a railway vehicle, the system comprising a deck including main longitudinal beams and two side longitudinal beams capable of being placed on two removeable rail bogies each of which is equipped with an intermediate chassis carrying centering and fixing means for said deck, wherein each intermediate chassis includes a pair of upwardly tapering conical vertical pegs projecting above the top face of said intermediate chassis serving as a bearing plane for said deck, and said deck includes, in the vicinity of each of its two ends, a pair of vertical hollow cylindro-conical bushes which flare downwardly and which are intended to receive corresponding ones of said conical pegs.

In one embodiment, said cylindro-conical hollow bushes are connected to said deck by means of a resilient member whose dimensions and whose stiffness are designed so that the load of the deck compresses said resilient member sufficiently for the deck to bear directly against the top face of an intermediate chassis when the conical pegs carried by said intermediate chassis are engaged in said hollow bushes.

Advantageously, said intermediate chassis includes two pairs of side guide ramps which ramps slope down inwardly and extend over the top face of said intermediate chassis, with the ramps being intended to provide lateral guidance and to center the deck while it is being placed on said intermediate chassis.

Advantageously, each intermediate chassis includes cross-beams and a pair of longitudinal guide ramps which are fixed to one of said cross-beams, which ramps slope down forwardly for ramps on the rear intermediate chassis and rearwardly for ramps on the front intermediate chassis and extend above the bearing plane of the deck on said intermediate chassis, with the ramps being intended to guide said deck longitudinally and to center it while it is being placed on said intermediate chassis.

In an embodiment, each intermediate chassis includes two pairs of locking bolts, with each bolt including a transverse wedge-shaped latch which co-operates with an inclined ramp fixed to one of said main longitudinal beams of said deck, and with the four slides being operated simultaneously from a handwheel by means of a motion transmission system controlled by the handwheel.

In an embodiment, a system of the invention includes rail bogies which are common to two successive decks enabling rail vehicles to be formed which are articulated to one another, wherein each of said bogies common to two decks includes two intermediate chassis which are articulated to each other about a vertical axis coinciding with the pivot axis to said bogie with each of said intermediate chassis carrying a pair of conical vertical pegs which engage in a pair of cylindro-conical bushes carried by each of said decks.

A first result of the invention is to provide dual-purpose rail/road semi-trailers in the event of the deck being equipped with a pivot for coupling to a road tractor, with hydraulic props and with a road axle assembly which can be raised by means of a ram or which is removeable.

A second result of the invention is to provide multimode goods transport systems such as containers capable of being transported by road, by ship, by cargo aircraft, or on flat rail trucks or cars and capable of being transformed into normal or mutually articulated rail vehicles.

A third result of the invention is to provide dual-purpose rail/road vehicles in which the deck is capable of being placed either on two removeable road axle assemblies and of being fitted with a draw bar, or else on being placed on two bogies for constituting a normal or an articulated rail vehicle.

Another result of the invention is to provide novel rail bogies each equipped with a single intermediate chassis provided with rail coupling means and equipped with a pair of conical pegs, with two pairs of lateral guide ramps, with one pair of longitudinal guide ramps, and with bolts, said bogies enabling a road vehicle or a container to be transformed into a normal rail vehicle.

Another result of the invention is to provide novel rail bogies each equipped with two intermediate chassis which are articulated to each other about a vertical axis coinciding with the pivot axis of the bogie, with each intermediate chassis being equipped with a pair of conical pegs, two pairs of lateral guide ramps, one pair of longitudinal guide ramps, and bolts, which bogies are suitable for transforming two transport systems such as two containers or two road semi-trailers equipped with axle assemblies that are raiseable or removeable into two mutually articulated rail vehicles bearing on a common bogie.

The conical pegs on the intermediate chassis of the rail bogies and the conical bushes fitted to the decks of the systems in accordance with the invention constitute means for providing accurate centering and mechanical connection between the deck and each of the rail bogies.

For a dual-purpose rail/road semi-trailer fitted with a road axle assembly capable of being raised by rams, and hydraulic or mechanical props, the conical pegs and the lateral and longitudinal guide ramps fitted to the auxiliary chassis allow the deck to be centered automatically relative to the bogies without requiring the use of any handling equipment other than the props and the rams for raising the axle assembly as already carried by the deck.

The conical pegs can readily be dimensioned so as to easily withstand the traction and compression forces to which a rail vehicle in accordance with the invention is subjected when incorporated in a train, and after having tests performed thereon, rail vehicles in accordance with the invention have been approved for use on French railways (SNCF).

The resilient connections interposed between the cylindro-conical bushes receiving the conical pegs and the framework of the deck serve to absorb the shock of the deck being lowered onto the intermediate chassis.

The stiffness of these resilient connections is such as to enable the connections to deform sufficiently under the effect of the weight of the deck to enable the deck to bear directly on the intermediate chassis so that the weight of the load is not exerted on the conical pegs which only need to withstand forces situated in a horizontal plane.

The bolts fitted to the intermediate chassis serve to fasten the deck to each intermediate chassis in order to prevent any risk of the deck moving upwards during rail travel.

The mechanical connection and centering means between each deck and an intermediate chassis of a rail bogie serve, in particular, to transform a single deck either into a normal rail vehicle fitted with two bogies each carrying coupling members for coupling to other vehicles, or else into an articulated rail vehicle with each end of the deck being placed on a bogie which is common to two successive rail vehicles, or else into the first or the last vehicle in a multiple unit of articulated rail vehicles by placing one end of the deck on a bogie carrying coupling members and placing the other end of the deck on a bogie which is common to two successive decks.

This means that a single system of the invention can be incorporated successively in a multiple unit of articulated vehicles and then in a train of normal vehicles after passing through a marshalling yard.

BRIEF DESCRIPTION OF THE DRAWINGS

Embodiments of the invention are described by way of example with reference to the accompanying drawings, in which.

MORE DETAILED DESCRIPTION

Figure 1:
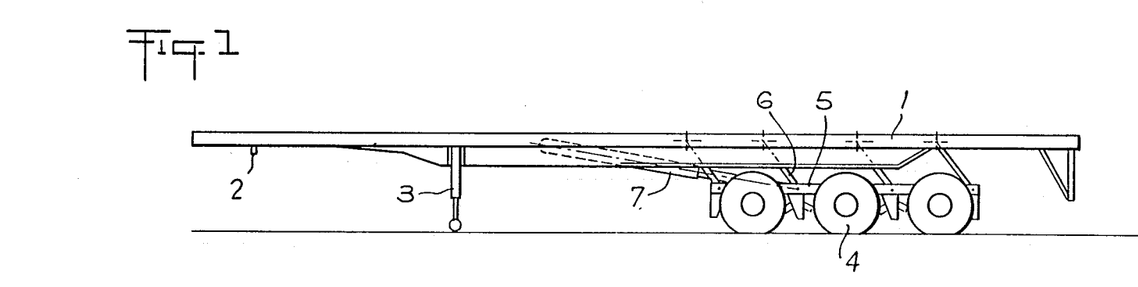
FIG. 1 is an elevation view of a vehicle in accordance with the invention in its road semi-trailer version.
Figure 2:
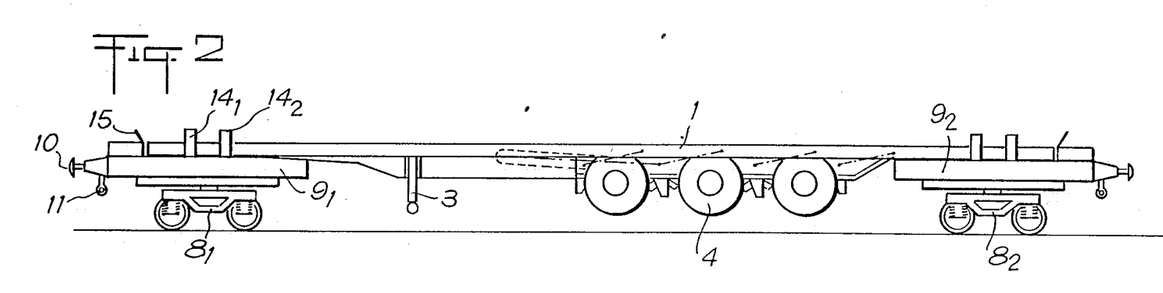
FIG. 2 is an elevation view of a vehicle in accordance with the invention used as a rail vehicle.

FIGS. 1 and 2 are diagrams of a dual-purpose vehicle in accordance with the invention capable of being used either as a road semi-trailer (FIG. 1), or else as a rail vehicle (FIG. 2).

This vehicle comprises a deck 1 which may be a simple flat deck as shown in FIGS. 1 and 2, but which may also, naturally, carry a body, a container, a tank, etc. . . .

The deck 1 includes a pivot 2 at its front end for coupling it to a tractor in order to constitute an articulated road vehicle, and two hydraulic or mechanical props 3 which support the front portion when disconnected from a tractor. At its rear end it includes a road axle assembly 4 of any conventional type suitable for the load to be carried, e.g. an assembly of three axles as shown in FIG. 1.

The road axle assembly 4 is mounted on an auxiliary chassis 5 which is connected to the chassis of the deck 1 by articulated links 6. An inclined ram 7 serves to raise the auxiliary chassis 5 in order to move the road axle assembly into a retracted position as shown in FIG. 2.

FIG. 2 shows a vehicle in accordance with the invention transformed into a normal rail vehicle. This transformation is obtained by placing the deck 1 on two removeable rail bogies $8_1$ and $8_2$. Each bogie is equipped with an intermediate chassis $9_1$ or $9_2$ which is fixed to the pivot box of the bogie and which carries equipment specific to rail operation, in particular buffers 10, coupling hooks 11, and connectors for bracking devices, etc. . . .

Dual-purpose rail/road vehicles are already known.

It is recalled that they enable a road vehicle to be transformed into a rail vehicle without transferring its load and without requiring any handling equipment to be used other than the props 3 and the ram 7, merely by placing the deck of the vehicle on the two removeable rail bogies which remain on the railway and which are engaged beneath the deck of the vehicle and are fixed thereto by retracting its road axle assembly. Conversely, they enable a rail vehicle to be transformed into a road vehicle by lowering the road axle assembly and withdrawing the two removeable bogies.

One of the problems posed by this type of vehicle is the problem of the means for centering the deck relative to the bogies, which means must be capable of obtaining and maintaining good centering without requiring forces to be exerted to displace the deck relative to the bogies.

Another problem lies in the mechanical connection means between the intermediate chassis $9_1$ and $9_2$ and the deck 1, since these connection means must be capable of withstanding major traction and compression forces when the vehicle is used as a rail vehicle and is incorporated in a train.

Each auxiliary chassis of a vehicle in accordance with the invention includes, on each side, two lateral guide devices $14_1$ and $14_2$. It also includes longitudinal guide devices 15. These devices in the form of ramps sloping down in an inwards direction guide the deck as it is moved down so as to center it approximately relative to the intermediate chassis.

Figure 3:
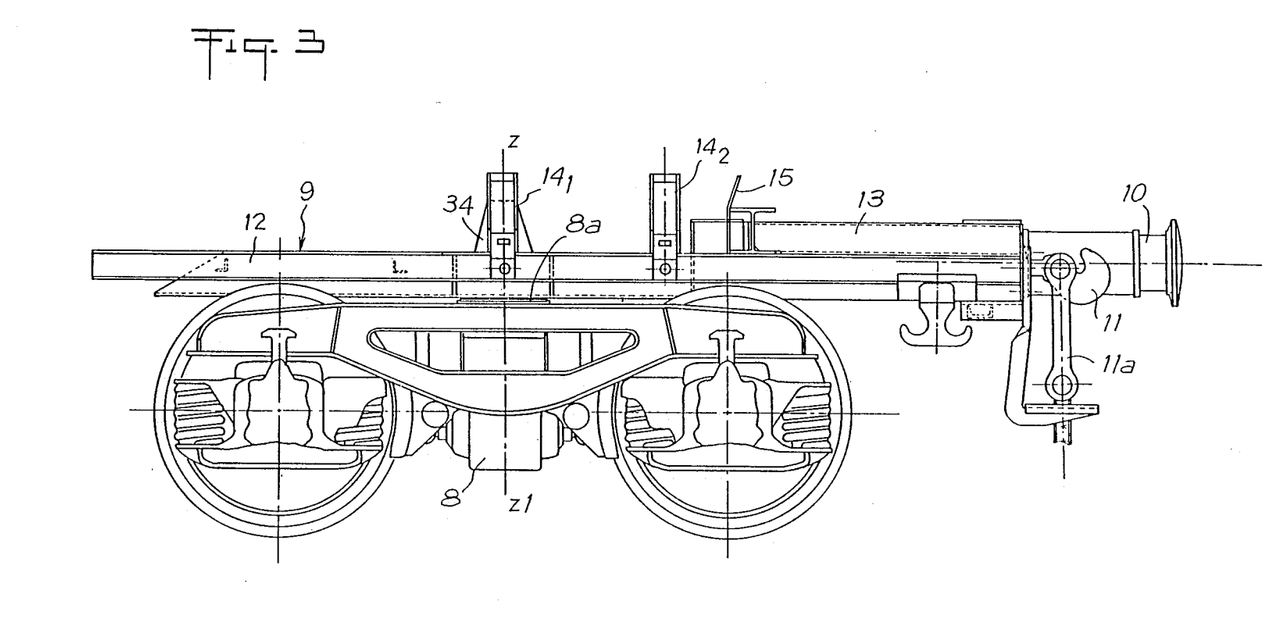
FIG. 3 is an elevation view of a removeable rail bogie fitted with an intermediate chassis.

FIG. 3 is an elevation view of a larger scale of a bogie 8 and of the intermediate chassis 9 associated therewith.

The bogie 8 is a bogie as standardized by the International Union of Railways (U.I.C.).

It comprises a pivot box 8a on which the intermediate chassis 9 is fixed in such a manner as to enable the chassis and the bogie to pivot relative to each other about a vertical axis z-z1.

The chassis 9 includes longitudinal beams 12 which are interconnected by cross beams. At one of its ends, it carries members specific to railways, in particular two buffers 10 and a coupling hook 11 together with a shackle 11a.

The intermediate chassis 9 includes a portion 13 which is raised above the bearing plane of the deck. This raised portion is level with the deck 1 when the deck is supported by two bogies.

the invention chassis 9 includes lateral devices for transverse guidance, e.g. two devices $14_1$ and $14_2$ situated on either side of the chassis, and devices for longitudinal guidance 15 which are described in greater detail below.

Figure 4:
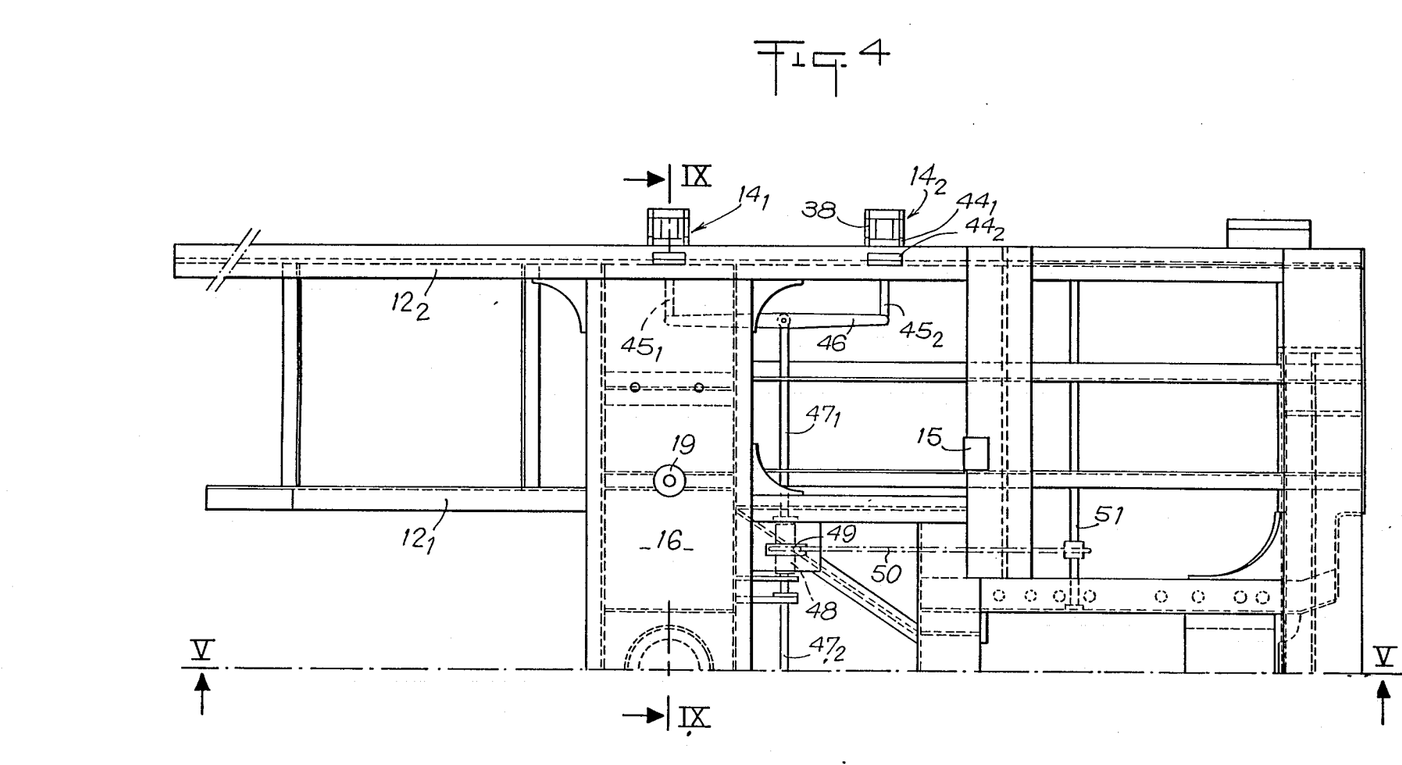
FIGS. 4 and 5 show an intermediate chassis in plan half view and in elevation.

FIG. 4 is a half view of the intermediate chassis 9 as seen from above.

Figure 5:
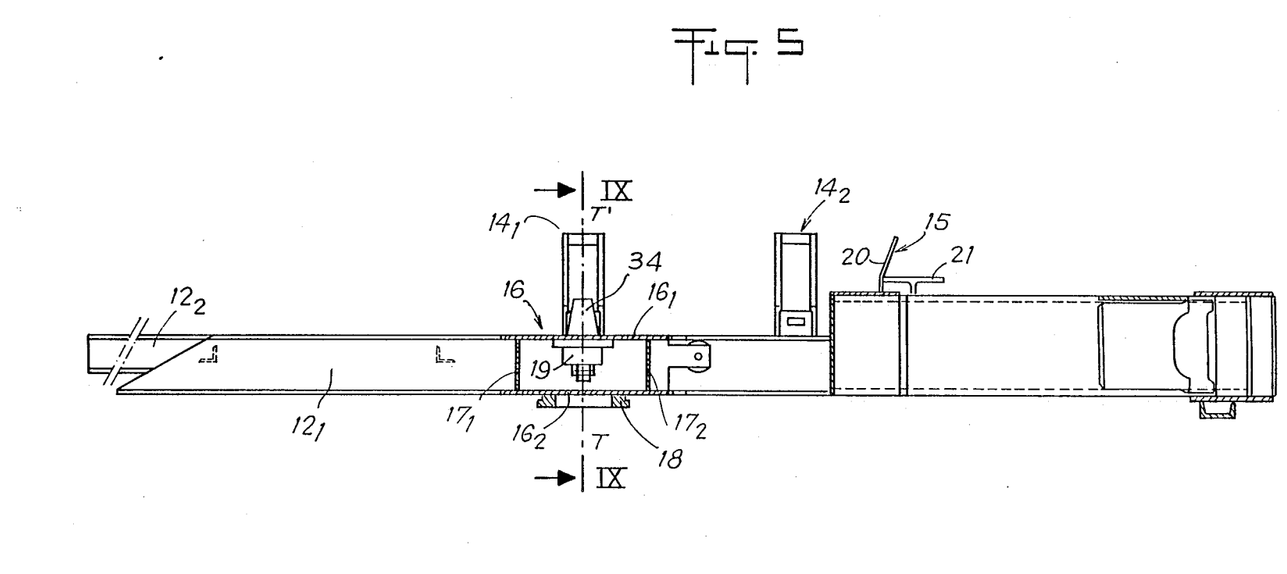

FIG. 5 is a vertical section on V—V of FIG. 4.

It can be seen in these figures that the intermediate chassis comprises a framework including two central longitudinal beams $12_1$ and two lateral longitudinal beams $12_2$ which are interconnected by cross beams. The framework includes, in particular, a box section cross beam 16 comprising two horizontal transverse plates $16_1$ and $16_2$ which are interconnected by two vertical plates $17_1$ and $17_2$. The box beam 16 is symmetrical about a transverse vertical plane TT'.

The top face of the top plate $16_1$ lies in the same plane as the top faces of the longitudinal beams and of the cross beams, and this plane serves as a bearing surface for the deck 1.

In the middle of its bottom face, the box beam 16 carries a ring 18 which is fixed on the pivot 8a of the bogie.

It includes two vertical hollow cylindrical pieces 19 which are fixed beneath the two plates $16_1$ and $16_2$ symmetrically on either side of the middle of the box beam and whose axes lie in the plane TT'. Each of these pieces is open at its top end is extended downwardly by a counterbore. Each is intended to receive a cylindro-conical centering peg.

Two transverse guide members $14_1$ are to be found at the two ends of the transverse box member 16. Two other transverse guide members $14_2$ are situated between the cross box member 16 and the end of the chassis which carries the rail coupling members.

FIGS. 4 and 5 show one of the two longitudinal guide members 15, with the other member being symmetrical about a central longitudinal plane.

FIG. 5 shows that the members 15 include a folded plate 20 which is welded at the front of a cross beam 21 and which forms an inclined ramp going down towards the end of the auxiliary chassis which is opposite from its end carrying the buffers and the rail coupling devices, i.e. it slopes forwardly for the chassis placed at the rear of the deck and rearwardly for the chassis placed at the front of the deck.

FIG. 5 shows that the lateral guide devices $14_1$ and $14_2$ and the longitudinal guide device 15 extend above the bearing plane for the deck on the auxiliary chassis as constituted by the top face of the plate $16_1$.

Figure 6:
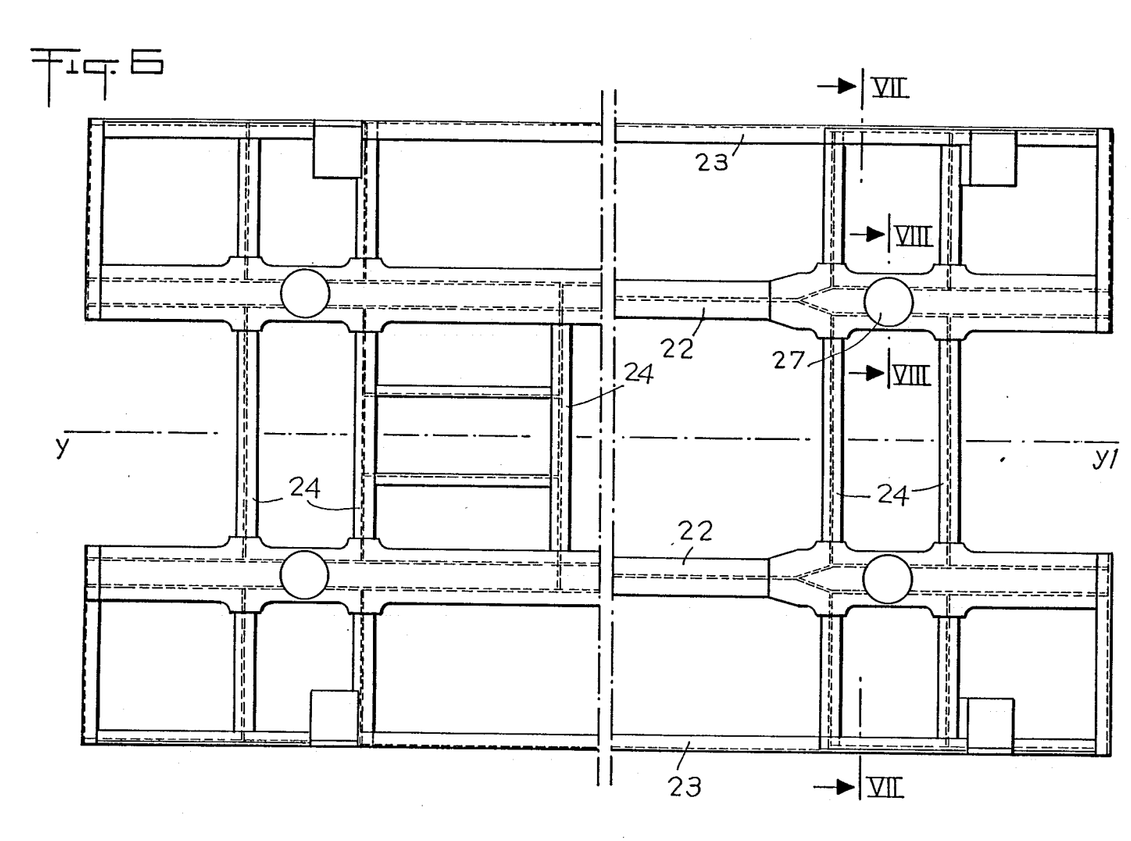
FIG. 6 is a plan view of the two ends of the deck of a vehicle in accordance with the invention.

FIG. 6 is a plan view of the two ends of the deck 1. This deck includes a framework which is symmetrical about the longitudinal vertical plane including the axis y-y1. In the middle portion of the deck, this frame comprises two main longitudinal beams 22 and two lateral longitudinal beams 23 which are interconnected by standard I-section spacers 24.

Figure 7:
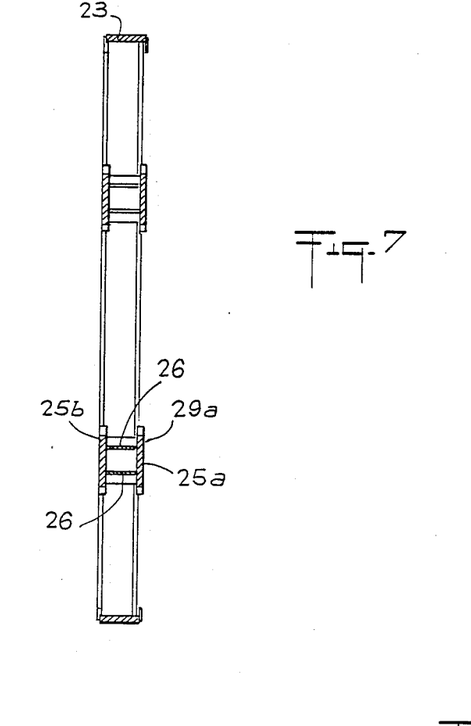
FIG. 7 is a cross-section of VII–VIII of FIG. 6.

The central portions of the two main longitudinal beams are I-section members. At each end of the deck, these beams are extended by two box-section beams comprising two thick horizontal planes 25a and 25b which are interconnected by two vertical planes 26 as can be seen in FIG. 7, which is a cross-section on VII—VII of FIG. 6. Each of the box-section beams carries a vertical cylinder 25 which houses a downwardly flaring female conical bush.

Figure 8:
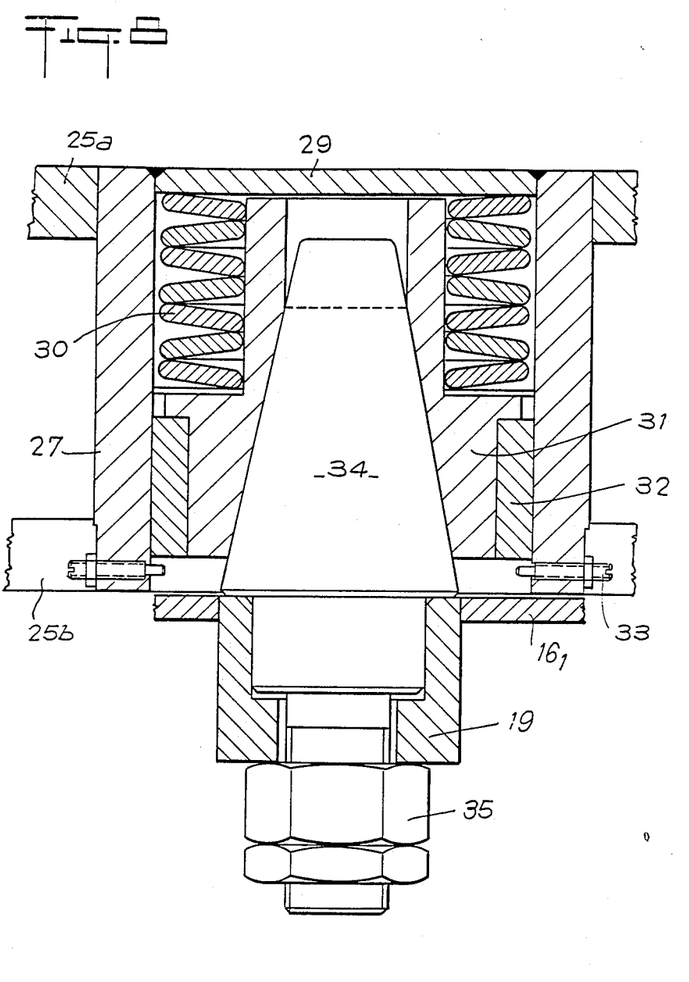
FIG. 8 is a cross-section of VIII—VIII of FIG. 6.

FIG. 8 is a section on a larger scale on VIII—VIII of FIG. 6 showing a portion of the deck 1 placed on the plate $16_1$ of the intermediate chassis.

FIG. 8 shows a cylinder 27 which is welded to the two plates 25a and 25b and to the two plates 26 lying outside the plane of section VIII—VIII.

The top end of the cylinder 27 is closed by a welded plate 29. The cylinder 27 contains a spring or a stack of spring washers 30 or any other equivalent resilient member, e.g. a ring or a buffer made of elastomer material. It also contains a vertical axis bushing 31 which delimits a cylindro-conical female cavity and which is kept centered in the cylinder 27 by a ring 32 so as to be capable of sliding freely inside the cylinder 27. The bush 31 and the ring 32 are kept in place inside the cylinder by screws 33. The bottom end of the cylinder 25 is in the same plane as the bottom face of the bottom plate 25b.

FIG. 8 also shows a section through the top portion of one of the two hollow pieces 19 of an intermediate chassis. It can be seen that this piece contains a conical vertical peg 34 which is fixed by a nut 35, which tapers upwardly, and which penetrates into the female cavity of the bush 31.

The two conical pegs 34 carried by each intermediate chassis $9_1$ and $9_2$ penetrate into the female cavities of the bushes 31 when the deck is lowered onto the bogies, and by virtue of their one-shapes they are capable of taking up offsets of a few centimeters in order to center the deck and the bogies relative to one another accurately, both in the transverse direction and in the longitudinal direction after they have been approximately centered by the inclined ramps 14 and 15 carried by the intermediate chassis.

The weight of the deck and its load bears on the resilient member 30 while the deck is being lowered. The resilient member is calibrated so that it deforms sufficiently to ensure that the bottom faces of the plates 25b come directly into contact with the top faces of the plates $16_1$ of the intermediate chassis, so that the pegs 34 do not have to withstand large vertical forces.

However, the pegs 34 are used for providing the mechanical connection between the deck and the intermediate chassis carrying the coupling devices, and these pegs are designed to withstand large horizontal forces.

Figure 9:
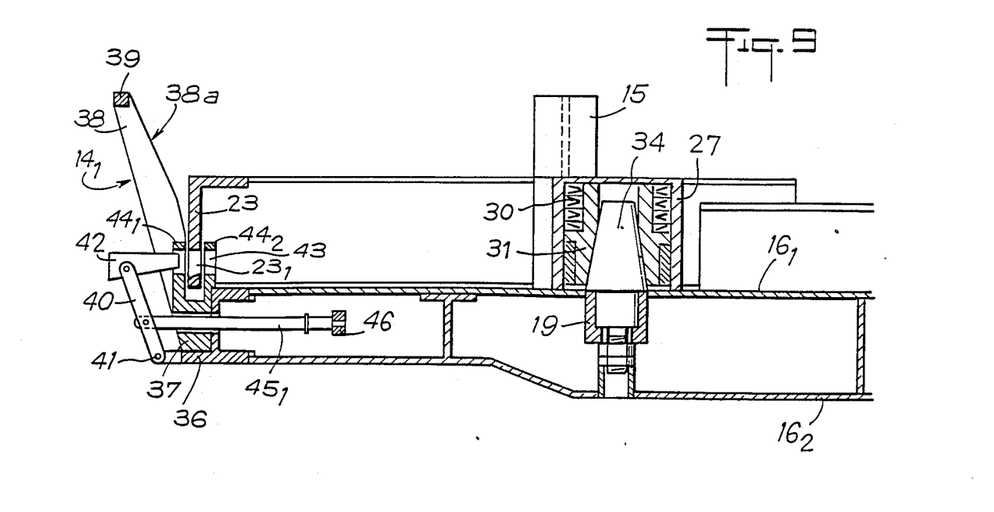
FIG. 9 is a cross-section of IX—IX of FIGS. 4 and 5.

FIG. 9 is a section on IX—IX of FIGS. 4 and 5.

This figure gives a front view of one of the longitudinal guides 15. It also shows one of the transverse guides $14_1$ in vertical section and in association with a bolt for locking the deck on the intermediate chassis.

FIG. 9 shows a lateral longitudinal beam 36 of the intermediate chassis having a mechanical piece 37 fixed on the outside thereof including two parallel flats 38 connected to a spacer 39. Each of the two flats 38 has an inclined inside face 38a, thereby constituting ramps which slope towards the inside and suitable for having the lateral longitudinal beams 23 of the deck slide therealong.

The guide devices 15, $14_1$, and $14_2$ have the effect of providing approximate deck centering and of brining the conical pegs 34 substantially into alignment with the bushings 31 carried by the deck when the deck is lowered onto the bogies.

The mechanical piece 37 includes a link 40 which pivots about a hinge 41. The end of the link 40 carries a wedge-shaped key 42 which passes through two openings 43 cut out in two flats $44_1$ and $44_2$ between which the vertical web of the beam 23 of the deck is received at a point where the bottom horizontal flange thereof is removed. The beam 23 also includes an opening $23_1$ which comes into alignment with the two openings 43. The opening $23_1$ has a chamfered bottom edge with the chamfer being at the same angle as the angle of the tapering key 42 such that when the key is engaged through the two openings 43 and through the opening $23_1$, its top edge presses against the two flats $44_1$ and $44_2$ and its bottom edge presses against the chamfered edge formed in the beam 23, thereby locking the beam to the intermediate chassis.

FIG. 9 shows that the link 40 is connected to a rod $45_1$ which forms part of a rod and lever linkage shown in part in FIG. 4. It can be seen in this figure that two rods $45_1$ and $45_2$ are connected to a lever 46 which is itself connected to an operating rod $47_1$.

A second operating rod $47_2$ can be seen which is connected to a second lever (not shown) which is symmetrical about the longitudinal midplane and which controls two rods for operating two keys fitted in the side bolts situated on the other side of the intermediate chassis.

The facing ends of the two rods $47_1$ and $47_2$ have oppositely-handed threads which are screwed into a nut 48 which is fixed to a sprocket wheel 49 operated by an endless chain 50 by means of an operating rod 51 leading to a handwheel (not shown) for simultaneously locking or unlocking the four keys 42 of the four side locks.

Figure 10:
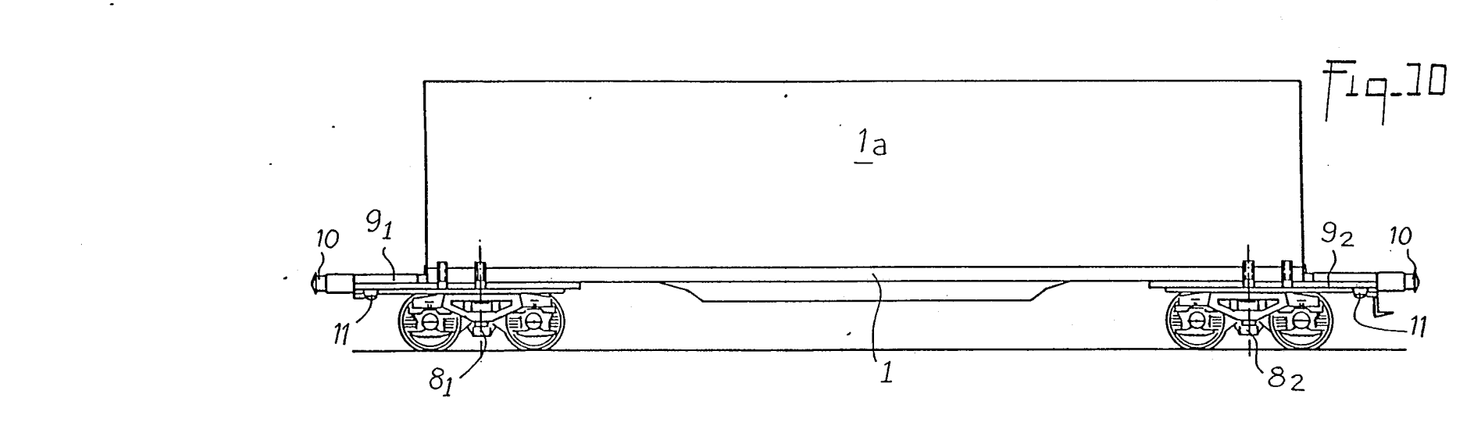
FIGS. 10 and 11 show a goods transport system in accordance with the invention used respectively as a normal rail vehicle fitted with two bogies each of which carries members for coupling to another rail vehicle, and as a container suitable for transport by ship, by air, or by ground vehicle.
Figure 11:
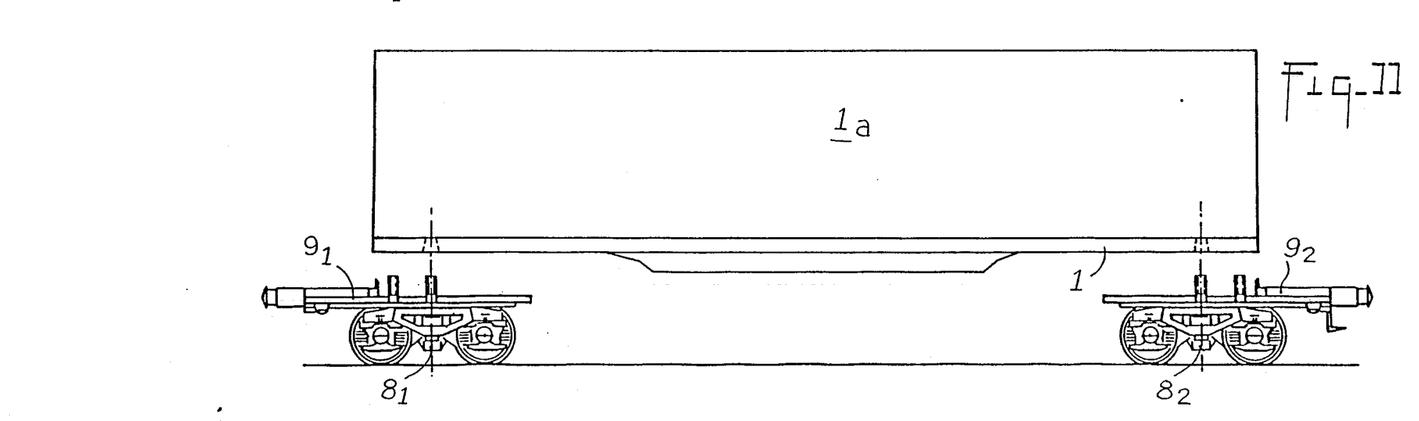

FIGS. 10 and 11 show a system in accordance with the invention comprising a deck 1 carrying a box defining a closed volume, for example. It is specified that this example is not limited and that the deck 1 could be bare or it could carry other equipment such as a tank, or a hopper, or side plates.

FIG. 10 shows the device transformed into a normal rail vehicle. This transformation is obtained by placing the deck 1 on two rail bogies $8_1$ and $8_2$ each of which is equipped with an intermediate chassis $9_1$ or $9_2$ carrying buffers 10 and coupling members 11. After being placed thereon, the deck is fixed in place. The bogies, their intermediate chassis, and the deck are identical to those shown in FIGS. 3 and 8 and corresponding portions are given the same references.

The system shown in FIG. 10 differs from that shown in FIG. 2 in that it does not include a raiseable road axle assembly nor does it include any props or pivot for coupling to a road tractor, which has the advantage of reducing the dead weight of the system.

FIG. 11 shows the system for FIG. 10 after the deck 1 has been separated from one of the two rail bogies. This operation requires the use of a crane or other hoisting device in order to raise the deck 1 and the goods contained in its box $1a$. This provides a multi-mode goods transport system in which the goods contained in the box 1 do not require individual trans-shipment, said system constituting a container which is transportable by ship, by air, or by ground vehicle, or even by being placed on a railway flat truck or car.

Figure 12:
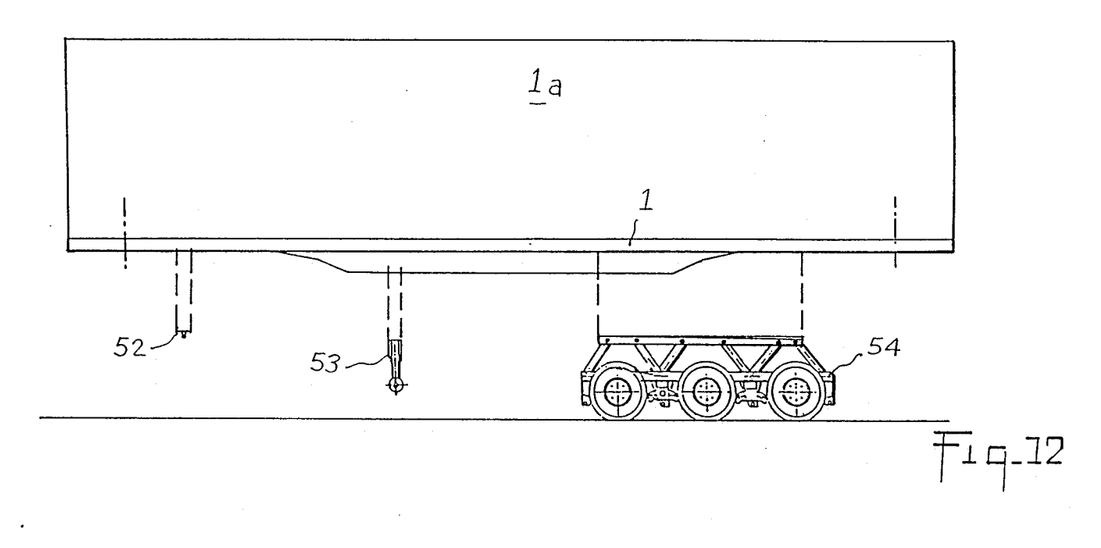
FIG. 12 shows a FIG. 10 system capable of being transformed into a road semi-trailer by being equipped with a removeable road axle assembly, with removeable props, and with a removeable pivot for coupling to a road tractor.

FIG. 12 shows another possible transformation of the system shown in FIG. 10. After it has been separated from the two rail bogies, the deck 1 is placed by hoisting means onto a removeable road axle assembly 54, and is fixed thereto, and it is also fitted with two hydraulic or mechanical props 53 and with a pivot 52 for coupling it to a road tractor, thereby transforming it into a road semi-trailer.

In another variant (not shown) each end of the deck 1 may be placed and fixed on a removeable road axle assembly and the deck may be provided with a drawbar so as to provide a road trailer.

Figure 13:
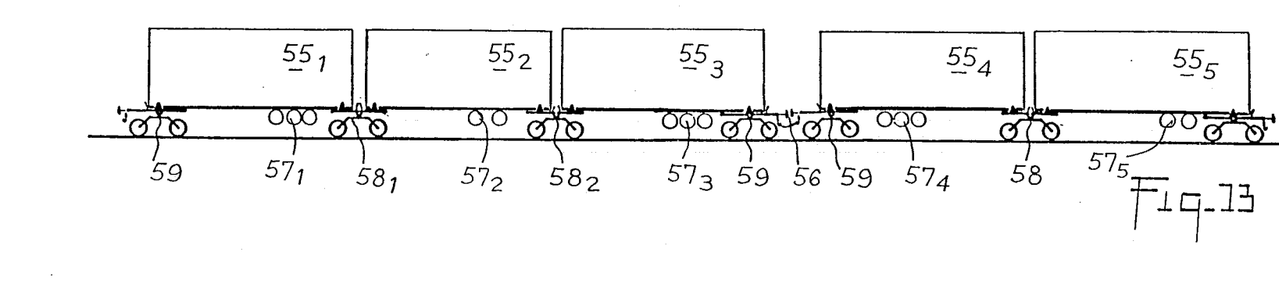
FIG. 13 shows a portion of a train comprising two multiple units of mutually articulated rail vehicles which are constituted by systems of the invention.

FIG. 13 is a diagrammatic view of a portion of a train comprising a first multiple unit of three vehicles $55_1$, $55_2$, and $55_3$ which are articulated to one another and a second multiple unit of two rail vehicles $55_4$ and $55_5$ which are articulated to each other, with the two multiple units being interconnected by a normal coupling 56. Naturally the number of articulated vehicles constituting each multiple unit and the number of multiple units in a train are arbitrary.

FIG. 13 shows an embodiment in which each rail vehicle includes a raiseable road axle assembly $57_1$, $57_2$, $57_3$, $57_4$, or $57_5$ so as to enable it to be transformed directly into a road semi-trailer. This example is not limiting, and each rail vehicle could include a deck without a raiseable road axle assembly and it could be transformable into a multi-mode container or into a road vehicle by adding an appropriate number of removeable road axle assemblies.

The novel feature of the transport systems shown in FIG. 13 lies in the fact that they are transformable into rail vehicles which are articulated to one another by means of special rail bogies 58 which are placed between two successive rail vehicles and which are common to each of the vehicles.

FIG. 13 shows that both ends of a deck, e.g. the deck of vehicle $55_2$, may be placed on respective common bogies $58_1$ and $58_2$. It can also be seen that first and last rail vehicles of such a multiple unit, e.g. vehicles $55_1$, $55_3$, $55_4$, and $55_5$ can be obtained by placing one end of a deck on a bogie 58 which is common to two vehicles and by placing the other end of the deck on a normal bogie 59 which is fitted with an intermediate chassis carrying coupling members 56 for coupling the vehicle to another multiple unit or to a normal rail vehicle.

It is also possible to place both ends of the deck on two normal bogies 59 in order to obtain a conventional rail vehicle.

Figure 14:
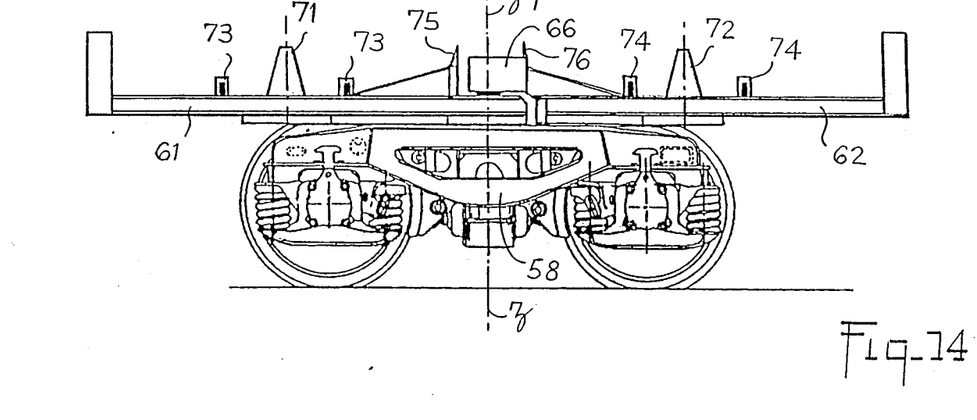
FIG. 14 is an elevation view of a rail bogie common to two successive articulated rail vehicles.

FIG. 14 is an elevation view of a bogie 58 which is common to two successive rail vehicles. The bottom portion of the bogie corresponds to international rail standards.

It has two axles provided with rail wheels and a central pivot articulated about a vertical axis z-z1.

Figure 15:
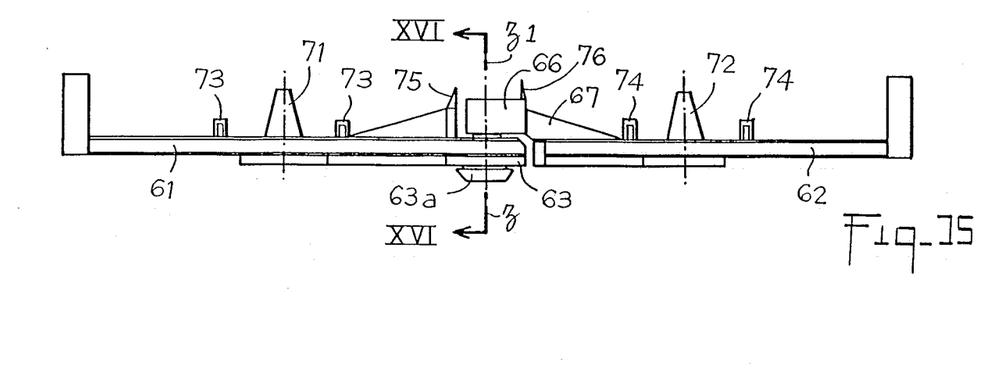
FIG. 15 is an elevation view of the two intermediate chassis of a common bogie.
Figure 16:
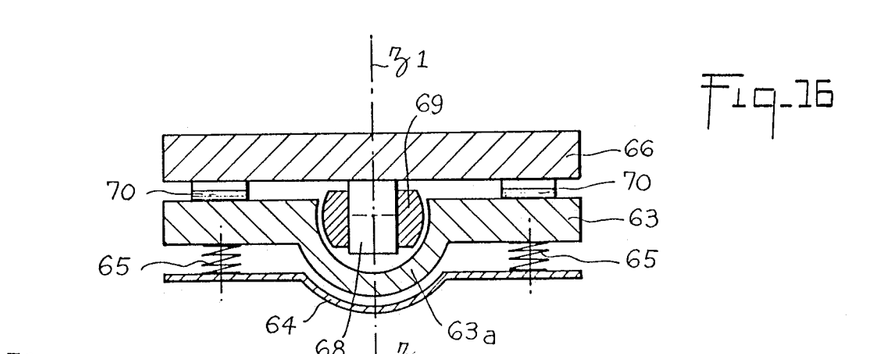
FIG. 16 is a cross-section of XVI—XVI of FIG. 15.

The bogie 58 includes two intermediate chassis 61 and 62 which are hinged to each other about a vertical axis z-z1 coinciding with the pivot axis of the bogie. FIG. 15 is an elevation view of the two intermediate chassis 61 and 62 showing how they are assembled together and FIG. 16 is a cross-section through FIG. 15 on a plane including the pivot axis z-z1.

One of the intermediate chassis, e.g. the front chassis 61 includes a cross beam 63 at its rear end which extends over the entire width of the chassis.

The middle of the cross beam 63 includes a hollow spherical socket 63a which rests in a spherical cup 64 forming a portion of the pivot of the bogie 58.

Springs 65 are fixed to the ends of the cross beam 63 and bear against the bogie 58 in order to limit the transverse inclination of the intermediate chassis 61. By virtue of the spherical socket, the intermediate chassis 61 is free to pivot relative to the bogie within the limits on lateral inclination imposed by the springs 65.

The second intermediate chassis 62 e.g. the rear chassis, includes a cross beam 66 at its front end which extends over the entire width of the chassis and which is situated above the top face of said chassis to which it is connected by gusset plates 67. The middle of the cross beam 66 includes a vertical length of shaft about the axis z-z1 with a ball portion 69 mounted at the end thereof having a spherical outside surface which is engaged in the hollow socket 63a of the first chassis 61.

The two ends of the cross beam 66 carry abutments 70 which bear against the cross-beam 63 of the first chassis. The bottom portions of the abutments 70 are semi-cylindrical in shape about a transverse axis so as to allow the second chassis to pivot relative to the first chassis both about the vertical axis z-z1 by virtue of the ball-and-socket connection 69-63a, and about a transverse horizontal axis constituted by the contacting generator lines of the two semi-cylindrical abutments 70.

FIGS. 14 and 15 show that each of the intermediate chassis 61 and 62 includes a pair of vertical conical pegs 71 or 72 with each pair comprising two pegs situated in the same transverse plane.

Each pair of conical pegs co-operates with a pair of cylindro-conical bushes situated beneath the deck of a system in accordance with the invention.

Each intermediate chassis includes a pair of ramps 73 and 74 on each of its sides, which ramps slope down in an inwards direction and serve to provide transverse guidance of a deck as it is being lowered onto the intermediate chassis.

Finally, each intermediate chassis includes corresponding longitudinal guide ramps 75 or 76 at its end.

The pairs of conical pegs 71 and 72, the cylindro-conical bushes in the deck, the lateral guide ramps 73 and 74, and the longitudinal guide ramps 75 and 76 ar all identical to those described with reference to FIGS. 3 to 8 and they perform the same functions. The only difference lies in the fact that the common bogies have two intermediate chassis which are articulated relative to each other whereas the normal bogies have only one intermediate chassis each.

Decks in accordance with the invention can be placed equally well on two normal bogies, or on two common bogies, or on one normal bogie and on one common bogie, thereby providing a high degree of flexibility in making up trains and in shunting vehicles. So long as marshalling yards are provided with normal bogies and with common bogies, it is possible to extract a vehicle from a multiple unit of articulated vehicles, and replace the common bogies by normal bogies and incorporate the vehicle in a conventional train. Conversely, a vehicle can be taken from a conventional train, and fitted with one or two common bogies and interposed in a multiple unit of articulated vehicles.

The intermediate chassis of the common bogies also include devices for locking a deck onto each of said intermediate chassis. These devices are not shown in FIGS. 14 and 15.

Figure 17:
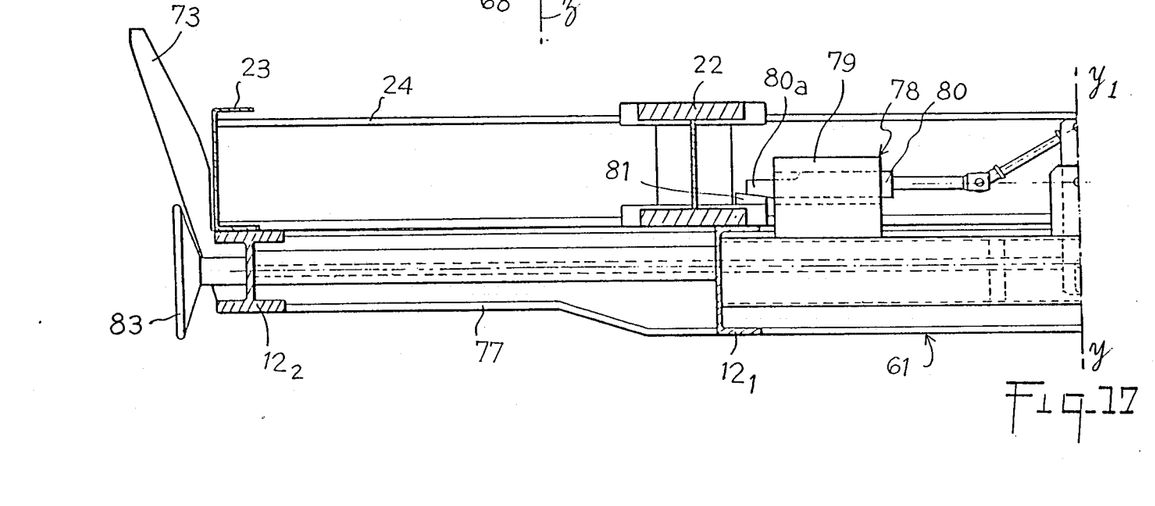
FIG. 17 is a transverse half-section through a second embodiment of a device for locking a deck onto an intermediate chassis.

FIG. 17 shows another embodiment of a device for locking a deck to an intermediate chassis and performing the same function as the device shown in FIG. 9. FIG. 17 is a transverse half-section showing a main longitudinal beam $12_1$ and a side longitudinal beam $12_2$ of an intermediate chassis 61 with the longitudinal a beans being interconnected by cross-beams 77. The side longitudinal beam $12_2$ carries a pair of lateral guide ramps 73.

FIG. 17 also shows a central longitudinal beam 22 of I-section and a side longitudinal beam 23 of the deck of the vehicle which are interconnected by cross-beams 24.

The intermediate chassis 56 includes two pairs of bolts 78 which are disposed symmetrically about the longitudinal mid-plane y-y1. Each bolt 78 includes a housing 79 which is fixed to the chassis and in which a slider 80 is free to move, with the slider being extended by a wedge-shaped latch 80a which extends from said housing.

The main longitudinal beam 22 of the deck carries inclined ramps 81 and each latch bears against one of the inclined ramps, thereby locking the deck to the intermediate chassis in the vertical direction.

The four sliders 80 are operated by a linkage 82 having levers which are moved simultaneously by means of a handwheel 83.

I claim:

1. A rail bogie for transforming two goods transport systems including respective decks, such as containers or road vehicles equipped with removeable or raiseable road axle assemblies, into an articulated rail vehicle, said bogie including first and second intermediate chassis, said first chassis including a central spherical socket which bears against a spherical cap carried by said bogie and said second chassis including a central spherical ball which is engaged in said spherical socket of the first chassis such that the first and second intermediate chassis are articulated relative to each other about a vertical axis which coincides with the pivot axis of said bogie, with each of said intermediate chassis carrying a pair of conical vertical pegs which co-operate with hollow cylindro-conical bushes carried by said decks, and each further carrying two pairs of lateral guide range situated on either side thereof and a pair of longitudinal guide ramps carried by a cross-beam thereof, and wherein said hollow cylindro-conical bushes are connected to each said deck by means of a resilient member whose dimensions and whose stiffness are designed so that the load of the deck compresses said resilient member sufficiently for the deck to bear directly against a top face of each intermediate chassis when the conical pegs carried by the intermediate chassis are engaged in said hollow bushes.

2. A goods transport system capable of being transformed into a railway vehicle, the system comprising a deck including main longitudinal beams and side longitudinal beams capable of being placed on at least two removeable rail bogies each of which is equipped with an intermediate chassis carrying centering and fixing means for said deck, wherein each intermediate chassis includes at least one upwardly tapering conical vertical peg projecting above a top face of said deck, and said deck includes, in the vicinity of each of its two ends, at least one vertical hollow cylindro-conical bush which flares downwardly and which is intended to receive said conical peg, and wherein said cylindro-conical hollow bush is connected to said deck by means of a resilient member whose dimensions and whose stiffness are designed so that the load of the deck compresses said resilient member sufficiently for the deck to bear directly against the top face of the intermediate chassis when the conical peg carried by said intermediate chassis is engaged in said hollow bush.

3. A system according to claim 2, wherein said main longitudinal beams of said deck are extended at their two ends by box section beams with said cylindro-conical hollow bush being located inside a vertical cylinder which is fixed inside a corresponding one of said box beams and is centered in said vertical cylinder by a ring.

4. A system according to claim 2, wherein each of said intermediate chassis includes two side longitudinal beams and two pairs of side guide ramps which are respectively fixed on said side longitudinal beams, which ramps slope down inwardly and extend over the top face of said intermediate chassis, with the ramps being intended to provide lateral guidance and to center the deck while it is being placed on said intermediate chassis.

5. A system according to claim 4, wherein each of said intermediate chassis includes cross-beams and a pair of longitudinal guide ramps which are fixed to one of said cross-beams, which ramps slope down forwardly for ramps on the rear intermediate chassis and rearwardly for ramps on the front intermediate chassis and extend above the bearing plane of the deck on said intermediate chassis, with the ramps being intended to guide said deck longitudinally and to center it while it is being placed on said intermediate chassis.

6. A system according to claim 4, wherein each intermediate chassis includes a transverse box section beam, which box section beam carries two cylindrical pieces which are placed on the axis of said beam symmetrically about the longitudinal axis of said intermediate chassis, each of said pieces carrying one of said conical pegs and said box section beam carrying one of said side guide ramps at each of its two ends.

7. A system according to claim 2, wherein each intermediate chassis carries two pairs of locking bolts, with each bolt including two parallel flats having openings, with one of said side longitudinal beams of said deck engaging between said flats, the locking bolts further including a wedge-shaped key member which engages in said openings and in said side longitudinal beams.

8. A system according to claim 7, wherein each of said wedge-shaped key members is hinged to a lever which is connected to said intermediate chassis by a hinge, with said levers being connected by rods to a linkage enabling all four bolts on a given chassis to be operated simultaneously.

9. A system according to claim 2, wherein each intermediate chassis includes two pairs of locking bolts, with each bolt including a transverse slide which is extended by a wedge-shaped latch which co-operates with an inclined ramp fixed to one of said main longitudinal beams of said deck, and with the four slides being operated simultaneously from a handwheel by means of a motion transmission system controlled by the handwheel.

10. A system according to claim 2, including rail bogies which are common to two successive decks enabling rail vehicles to be formed which are articulated to one another, wherein each of said bogies common to two decks includes two intermediate chassis which are articulated to, and overlap, each other about a vertical axis coinciding with the pivot axis of said bogie with each of said intermediate chassis carrying a pair of conical vertical pegs which engage in a pair of cylindro-conical bushes carried by each of said decks.

11. A system according to claim 10, wherein one of said intermediate chassis includes, at one of its ends, a first cross-beam which carries a hollow spherical socket in its center, said socket resting in a spherical cup carried by said common bogie, and wherein the second intermediate chassis includes, at one of its ends, a second cross-beam which is placed above the top face of said second cross-beam which is with the second cross-beam carrying a spherical ball member in its center which ball member is engaged in said hollow spherical socket, said second cross-beam also carrying two abutments, one at each end, which bear against the first cross-beam via a cylindrical surface having a transverse axis and constituting a transverse articulation.

12. A system according to claim 2, wherein said deck may be fitted with a pivot for coupling it to a road tractor, with hydraulic props, and with a road axle assembly capable of being raised by a ram or which is removeable, thus constituting a dual-function vehicle capable of being used successively as a road semi-trailer and as an articulated or non-articulated rail vehicle, without individually trans-shipping goods.

13. A system according to claim 2, wherein said deck may be incorporated in a goods transport system such as a container capable of being transported by ship, by air, by a ground vehicle, by a rail flat truck or car, and also of being transformed into an articulated or a non-articulated rail vehicle.

14. A system according to claim 2, wherein said deck is suitable for being fitted with a draw-bar and with two removeable road axle assemblies, thereby enabling it to be used either as a road trailer or else as an articulated or non-articulated rail vehicle.

15. A rail vehicle including a goods transport system having a deck and a raiseable road axle assembly extending from the deck connectable to a rail bogie, said bogie including axles provided with rail wheels, a central pivot, and an intermediate chassis which is fixed to said central pivots and which carries members for coupling to another rail vehicle, wherein said intermediate chassis includes a pair of vertical conical pegs which taper upwardly and which project above a top face of said chassis, which pegs are intended to engage cylindro-conical bushes carried by said deck by means of a resilient member whose dimensions and whose stiffness are designated so that the load of the deck compresses said resilient member sufficiently for the deck to bear directly against the top face of the intermediate chassis when the conical pegs carried by said intermediate chassis are engaged in said hollow bushes, said chassis also including lateral guide ramps, sloping down inwardly, situated on the sides of the chassis and at least one longitudinal guide ramp fixed on a cross-bar of said chassis.

* * * * *